United States Patent
Komatsu et al.

(10) Patent No.: US 8,437,539 B2
(45) Date of Patent: May 7, 2013

(54) IMAGE PROCESSING APPARATUS AND IMAGE PROCESSING METHOD

(75) Inventors: Satoru Komatsu, Utsunomiya (JP); Yasuhiro Sawada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1172 days.

(21) Appl. No.: 12/266,975

(22) Filed: Nov. 7, 2008

(65) Prior Publication Data

US 2009/0129696 A1 May 21, 2009

(30) Foreign Application Priority Data

Nov. 16, 2007 (JP) ................................ 2007-298532

(51) Int. Cl.
*G06K 9/00* (2006.01)
*G06K 9/40* (2006.01)

(52) U.S. Cl.
USPC ............ 382/162; 382/255; 382/275; 348/241

(58) Field of Classification Search .................. None
See application file for complete search history.

(56) References Cited

U.S. PATENT DOCUMENTS

| | | | | |
|---|---|---|---|---|
| 4,605,956 A * | 8/1986 | Cok | ............... | 348/242 |
| 4,642,678 A * | 2/1987 | Cok | ............... | 348/242 |
| 4,663,655 A * | 5/1987 | Freeman | ............... | 348/242 |
| 5,220,620 A * | 6/1993 | Nakano et al. | ............... | 382/167 |
| 5,398,124 A * | 3/1995 | Hirota | ............... | 358/530 |
| 5,778,106 A * | 7/1998 | Juenger et al. | ............... | 382/275 |
| 5,982,953 A * | 11/1999 | Yanagita et al. | ............... | 382/294 |
| 6,356,672 B1 * | 3/2002 | Feng et al. | ............... | 382/312 |
| 6,621,595 B1 * | 9/2003 | Fan et al. | ............... | 358/3.26 |
| 6,621,937 B1 * | 9/2003 | Adams et al. | ............... | 382/275 |
| 6,625,329 B1 * | 9/2003 | Donner et al. | ............... | 382/277 |
| 6,650,795 B1 * | 11/2003 | Motta | ............... | 382/312 |
| 6,671,401 B1 * | 12/2003 | Adams et al. | ............... | 358/533 |
| 6,724,702 B2 | 4/2004 | Taguchi et al. | | |
| 6,754,279 B2 * | 6/2004 | Zhou et al. | ............... | 375/240.28 |
| 6,791,609 B2 * | 9/2004 | Yamauchi et al. | ............... | 348/273 |
| 6,829,016 B2 * | 12/2004 | Hung | ............... | 348/581 |
| 6,914,628 B1 * | 7/2005 | Kuwata et al. | ............... | 348/272 |
| 6,915,024 B1 * | 7/2005 | Maurer | ............... | 382/274 |
| 7,057,659 B1 | 6/2006 | Mihara et al. | | |
| 7,330,209 B2 * | 2/2008 | Osamato | ............... | 348/273 |
| 7,460,728 B2 * | 12/2008 | Kawanishi et al. | ............... | 382/274 |
| 7,587,099 B2 * | 9/2009 | Szeliski et al. | ............... | 382/275 |
| 7,657,123 B2 * | 2/2010 | Herley | ............... | 382/300 |
| 7,751,619 B2 * | 7/2010 | Kawanishi et al. | ............... | 382/167 |
| 7,920,146 B2 * | 4/2011 | Yamada | ............... | 345/594 |
| 8,090,199 B2 * | 1/2012 | Spampinato et al. | ............... | 382/167 |
| 8,098,294 B2 * | 1/2012 | Nashizawa | ............... | 348/222.1 |

(Continued)

FOREIGN PATENT DOCUMENTS

| | | |
|---|---|---|
| JP | 2001-145117 A | 5/2001 |
| JP | 2003-018407 A | 1/2003 |

(Continued)

*Primary Examiner* — Manav Seth

(74) *Attorney, Agent, or Firm* — Canon USA, Inc., IP Division

(57) ABSTRACT

An image processing apparatus is configured to reduce a color blur in a color image, and includes a color blur process determination part configured to change at least one of a color blur that serves as a reduction object and an estimation method of an amount of the color blur according to at least one of a characteristic of an image and an imaging condition.

17 Claims, 16 Drawing Sheets

U.S. PATENT DOCUMENTS

| | | | |
|---|---|---|---|
| 8,115,820 B2* | 2/2012 | Uchiyama et al. | 348/222.1 |
| 8,144,984 B2* | 3/2012 | Sawada et al. | 382/167 |
| 8,155,441 B2* | 4/2012 | Sawada et al. | 382/167 |
| 2002/0012054 A1* | 1/2002 | Osamato | 348/273 |
| 2002/0114532 A1* | 8/2002 | Ratner et al. | 382/266 |
| 2003/0002735 A1* | 1/2003 | Yamamoto et al. | 382/167 |
| 2003/0108245 A1* | 6/2003 | Gallagher et al. | 382/228 |
| 2004/0120598 A1* | 6/2004 | Feng | 382/263 |
| 2004/0218813 A1* | 11/2004 | Okada et al. | 382/167 |
| 2006/0093234 A1* | 5/2006 | Silverstein | 382/255 |
| 2008/0137947 A1* | 6/2008 | Sawada et al. | 382/167 |
| 2008/0170124 A1* | 7/2008 | Hatanaka et al. | 348/208.4 |
| 2008/0181495 A1* | 7/2008 | Spampinato et al. | 382/167 |
| 2008/0219585 A1* | 9/2008 | Kasai et al. | 382/274 |
| 2012/0070083 A1* | 3/2012 | Ishiga et al. | 382/167 |

FOREIGN PATENT DOCUMENTS

| | | |
|---|---|---|
| JP | 2006-121138 A | 5/2006 |
| JP | 2006-208487 A | 8/2006 |
| JP | 2007-129388 A | 5/2007 |

* cited by examiner

IMAGE PROCESSING APPARATUS AND IMAGE PROCESSING METHOD

BACKGROUND OF THE INVENTION

1. Field of the Invention

The present invention relates to an image processing apparatus and an image processing method which are configured to provide a so-called color blur reduction process to a color image obtained from the imaging.

2. Description of the Related Art

A color image pickup system generates an originally nonexistent color as a color blur around a bright part on an image due to a chromatic aberration of an imaging optical system. The color blur is likely to occur at part distant from a central wavelength of the imaging optical system, and a visible-light color image pickup system causes artifacts in blue, in red, in purple that is a blend of blue and red in a blur shape. This color blur is also referred to as a purple fringe.

A combination of plural lenses having different dispersions can optically reduce the chromatic aberration to some extent. However, as a small size of a digital camera progresses, high resolution image sensors (or image pickup devices) and smaller optical systems are increasingly demanded, and it is difficult to sufficiently reduce the chromatic aberration only by the optics. Therefore, the image processing is required to reduce an artifact.

The chromatic aberration is roughly classified into a lateral chromatic aberration (chromatic aberration of magnification) and a longitudinal (or axial) chromatic aberration. When the light from a light source images on a focal plane via an imaging optical system, as shown in FIG. 1, the lateral chromatic aberration appears as shifts of imaging positions of a B(Blue) ray having a wavelength of about 450 nm, a G(Green) ray having a wavelength of about 550 nm, and a R(Red) ray having a wavelength of about 650 nm shift in the image surface direction. On the other hand, when the light from a light source images on a focal plane via an imaging optical system, as shown in FIG. 2, the longitudinal chromatic aberration appears as shifts of imaging positions of the RBG rays in the optical-axis direction.

As disclosed in U.S. Pat. No. 6,724,702, the lateral chromatic conversion of a digital imaging system of a primary color system can be corrected through a geometric conversion that applies a different deformation to each color plane of RGB.

On the other hand, the longitudinal chromatic aberration means, in an image that is focused with the G (Green) plane as a central wavelength of the visible light region, for example, that the image is out of focus with respect to the R(Red) plane and B(Blue) plane that are ends of the visible light. This cannot be corrected by the geometric conversion although it is effective to the lateral chromatic aberration. The longitudinal chromatic aberration can be made inconspicuous by lowering the chroma of a color blur area as disclosed in Japanese Patent Laid-Open No. ("JP") 2001-145117, or can be corrected by applying a different contour emphasis process to each color plane of RGB as disclosed in JP 2003-018407.

However, a chroma lowering process disclosed in JP 2001-145117 is a process that degrades a color of a bright pixel down to a brightness level of another color. This process is effective in reducing unnaturalness by erasing a color of the color blur, but the original colors of a subject can sometimes be also influenced and the image is likely grayish irrespective of the existence of the color blur.

The process disclosed in JP 2003-018407 utilizes deconvolution and its approximate contour emphasis process, and is performed by calculating a filter parameter. However, this process fixes G as a reference, and cannot handle a wide variety of color blurs.

The conventional color blur reduction process always provides the same process to blurs that can differ according to images, and cause an unnatural color depending upon a type of a blur or cannot sufficiently reduce or leave a color blur.

SUMMARY OF THE INVENTION

The present invention is directed to an image processing apparatus and an image processing method which can properly change a color blur reduction process to a wide variety of color blurs in color images obtained through the photography, effectively reduce a color blur, and reproduce an original color of a subject.

An image processing apparatus according to one aspect of the present invention is configured to perform a process to reduce a color blur in a color image. The image processing apparatus includes a color blur process determination part that changes at least one of a color blur that serves as a reduction object and an estimation method of an amount of the color blur according to at least one of a characteristic of an image and an imaging condition.

Further features of the present invention will become apparent from the following description of exemplary embodiments (with reference to the attached drawings).

DESCRIPTION OF THE EMBODIMENTS

Figure 1:
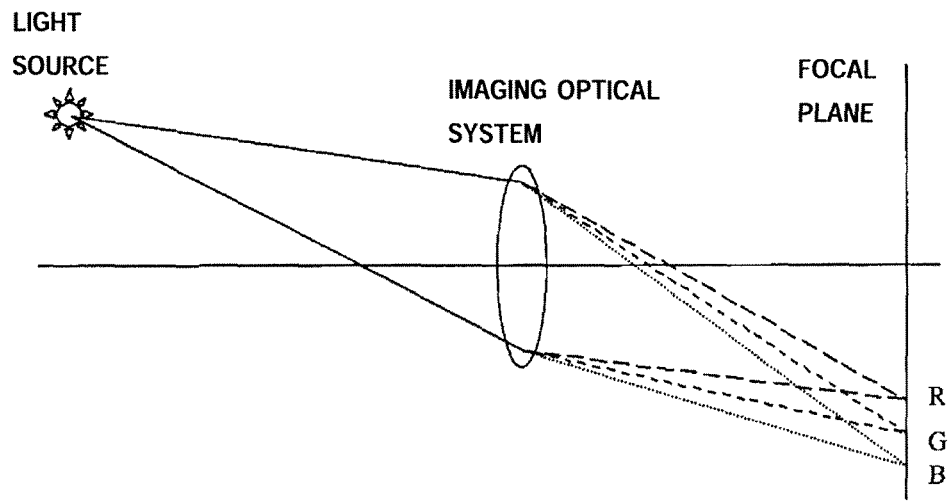
FIG. 1 is an explanatory view of the lateral chromatic aberration.
Figure 2:
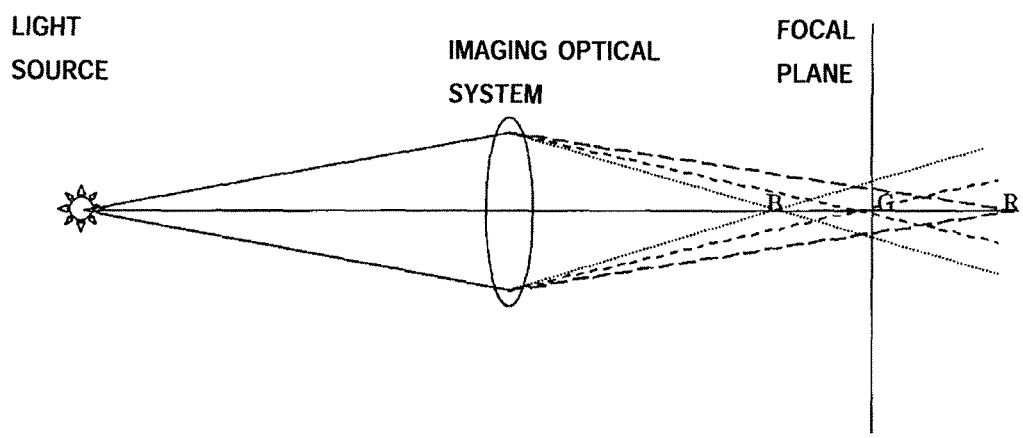
FIG. 2 is an explanatory view of the longitudinal chromatic aberration.

Referring now to the drawings, a description will be given of a preferred embodiment of the present invention.

First Embodiment

Figure 3:
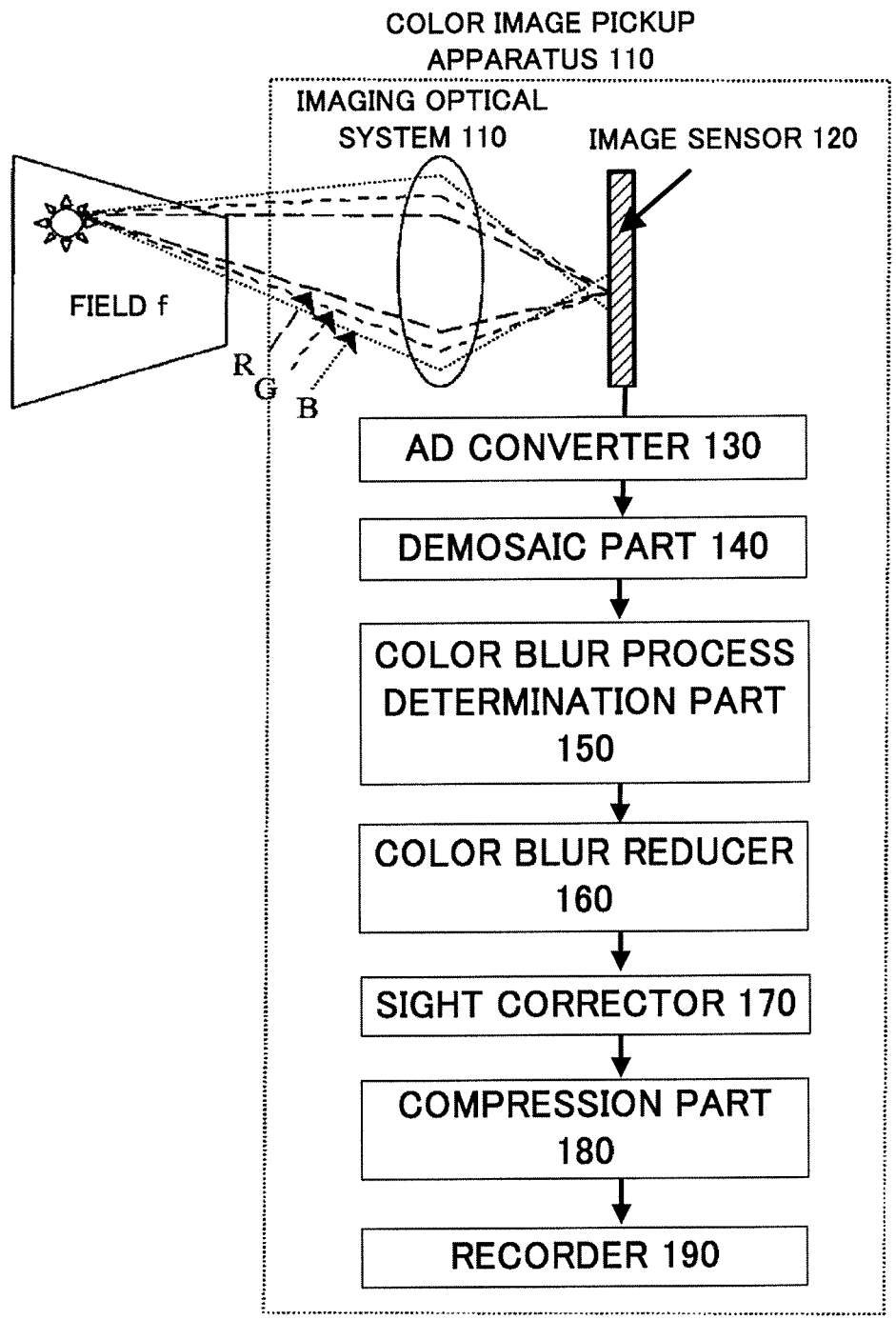
FIG. 3 is a block diagram showing a structure of a color image pickup apparatus according to a first embodiment of the present invention.

FIG. 3 shows a color image pickup apparatus 100 that utilizes an image processing method or is mounted with an image processing apparatus according to a first embodiment of the present invention.

The color image pickup apparatus 100 includes an imaging optical system 110, an image sensor 120, such as a CCD sensor and a CMOS sensor, an AD converter 130, a demosaic part 140, a color blur process determination part 150, a color blur reducer 160, a sight corrector 170, a compression part 180, and a recorder 190.

Although a field shown in FIG. 3 (imaging area or subject) f and the rays of R (red), G (green), and B (blue) are not the elements of the color image pickup apparatus 100, they are illustrated for description purposes.

In FIG. 3, the taken field f is imaged on the image sensor 120 via the imaging optical system 110. In general, an imaging optical system in a color image pickup apparatus is provided with a certain chromatic aberration correction. The longitudinal chromatic aberration of the imaging optical system 110 of this embodiment is corrected for all wavelength regions to some extent, and well corrected particularly for the G wavelength region; a more longitudinal chromatic aberration leaves for the other wavelength regions than that for the G wavelength region. Thus, other aberration corrections can be improved and the image pickup apparatus can be made smaller by degrading the correction criteria of the longitudinal chromatic aberration in the B wavelength region.

Figure 4:
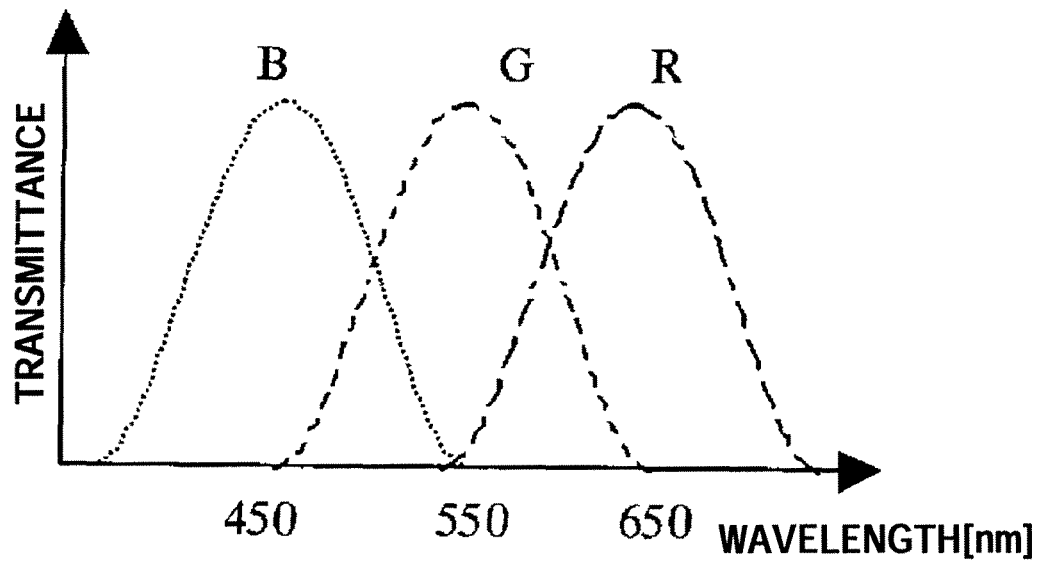
FIG. 4 is an explanatory view of a primary color filter.
Figure 5:
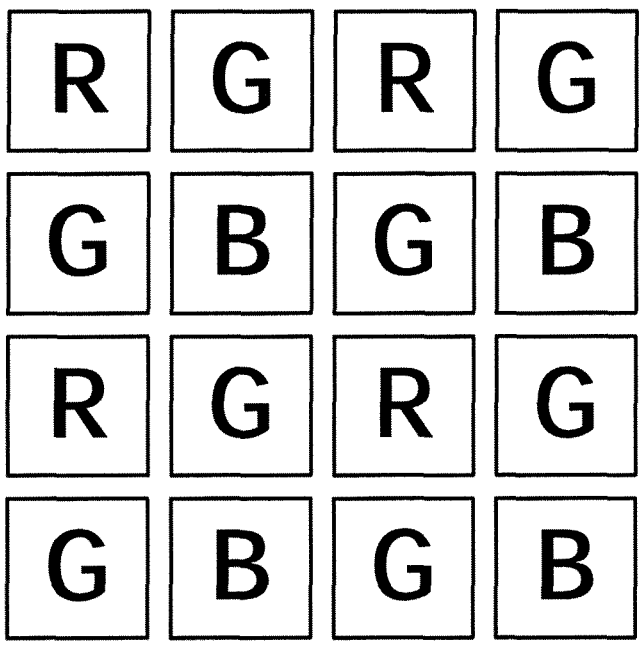
FIG. 5 is an explanatory view of a color filter array.

The image sensor 120 is a single-plate color image sensor having a general primary color filter system. The primary color filter system includes three types of color filters having main transmission bands near 650 nm, 550 nm, and 450 nm, as shown in FIG. 4, and images color planes corresponding to the RGB bands. The single-plate color image sensor spatially arranges these color filters for each pixel, as shown in FIG. 5, and each pixel can obtain the intensity of only a single color plane. Therefore, a color mosaic image is output from the image sensor 120.

A three-plate type color image sensor may be used, which splits the incident light into the RGB wavelength regions using a color splitting prism (not shown) and images the light having a different wavelength with a separate image sensor. In this case, the demosaic part 140 is unnecessary.

The AD converter 130 converts a color mosaic image output as an analog voltage from the image sensor 120, into digital data suitable for the subsequent image processing.

The demosaic part 140 interpolates a color mosaic image, and generates a color image in which all pixels have RGB color information. A variety of methods are proposed for the interpolation approach from a simple linear interpolation to a complicated approach introduced in E. Chang, S. Cheung, and D. Pan, "Color filter array recovery using a threshold-based variable number of gradients," Proc. SPIE, vol. 3650, pp. 36-43, January 1999. The interpolation approach of this embodiment can use any one of these methods or another method.

Figure 6:
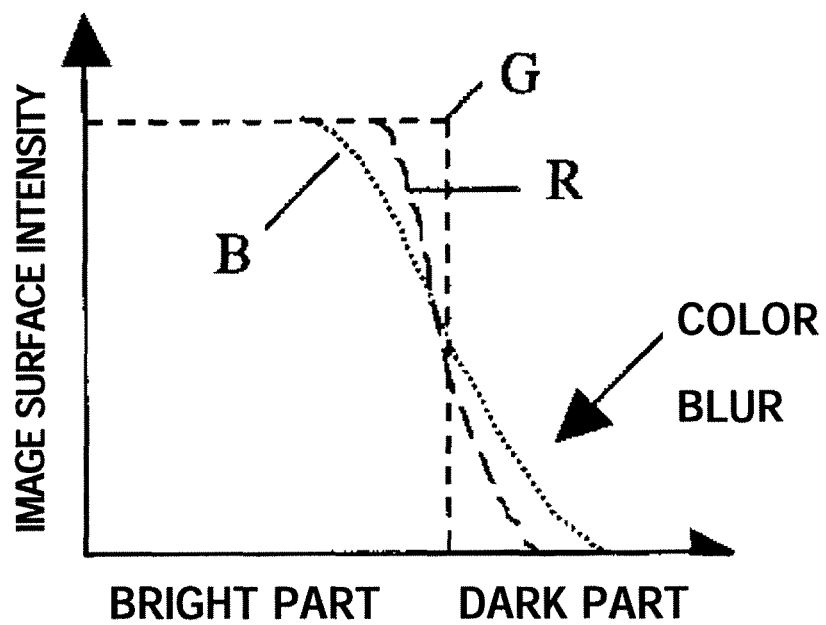
FIG. 6 is an explanatory view of a color blur at the boundary between the brightness and the darkness.

The color image generated by the demosaic part 140 has resolutions of the R (red) plane and the B (blue) plane lower than the resolution of the G (green) plane due to the chromatic aberration of the imaging optical system 110. Therefore, color blurs or fuzzes of R and B occur at the boundary between the brightness and the darkness, for example, as shown in FIG. 6, and there occur fringes or artifacts of R, B and purple as a blend of R and B around the bright part. The blur levels are different between R and B due to the characteristic of the imaging optical system 110 and the spectroscopic distribution of the light source in the image.

This embodiment uses a RGB primary color system for a color filter of the image sensor 120, but may use a color filter of a complementary color system, which provides a color image composed of the RGB color planes through the color conversion process.

The color blur process determination part 150 determines the process content to be performed by the color blur reducer 160, according to a characteristic (or "feature" hereinafter) of an input color image and an imaging condition, as detailed later.

The color blur reducer 160 extracts a color blur area through a spatial operation, estimates a color blur amount, subtracts the estimated amount from the input color image, and reduces the color blur.

Next follows a process by the sight corrector 170. The sight corrector 170 mainly performs a process that intends to improve an appearance of a color image. This image correction includes, for example, a tone curve (gamma) correction, a chroma emphasis, a hue correction, and an edge emphasis.

As the last process, the compression part 180 compresses the corrected image using a method, such as JPEG, and reduces a size used for recording.

The color image that has undergone the compression process is recorded by the recorder 190 in a recording medium, such as a hard disc drive, a DVD, a magnetic tape, and a flash memory.

Those processing components from the image sensor 120 to the recorder 190 may actually include separate devices or a single microprocessor.

Figure 7:
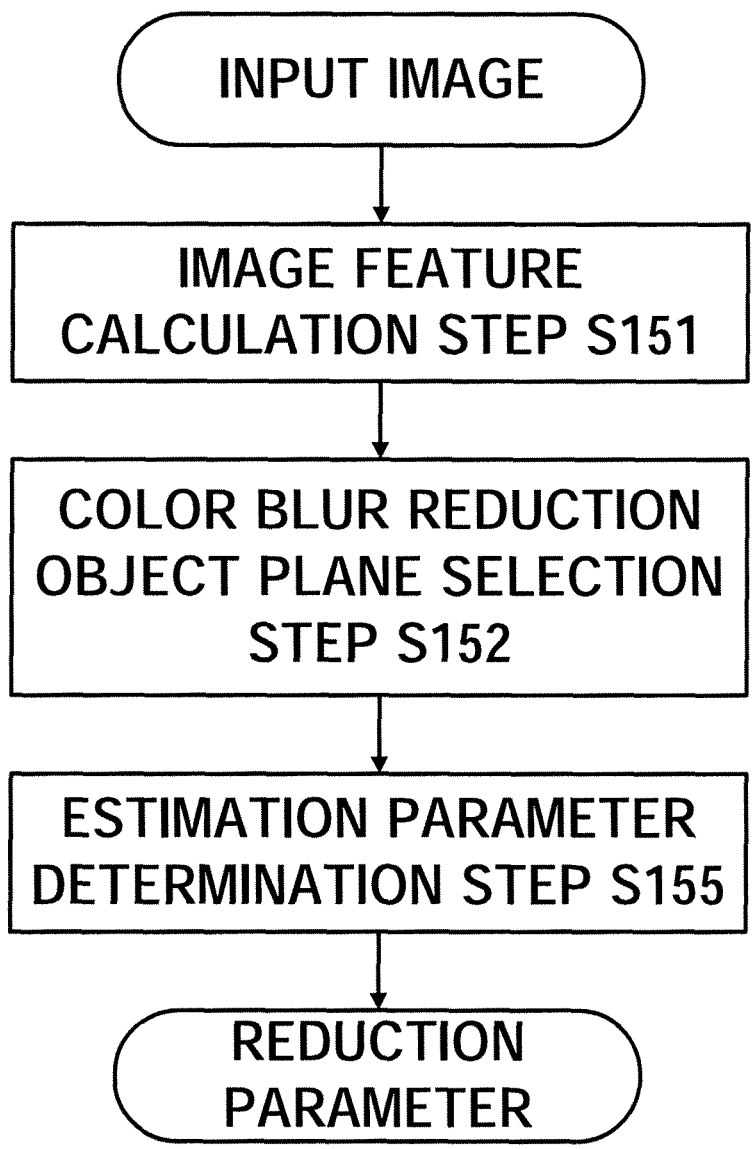
FIG. 7 is a flowchart of a structure (processing procedure) of a color blur process determination part in the image pickup apparatus according to the first embodiment.

Referring now to the flowchart shown in FIG. 7, a description will be given of a process or an image processing method by the color blur process determination part 150. The process at the color blur process determination part 150 includes an image feature calculation step S151, a color blur reduction object plane selection step S152, and an estimation parameter determination step S155. These processes are executed according to a computer program (image processing program) stored in a memory in an image pickup apparatus 100. This is true of other embodiments, which will be described later.

A normal imaging optical system is designed with the G wavelength region as a reference. Therefore, although it depends upon the imaging optical system, a chromatic aberration from the R wavelength to the B wavelength basically appears as a color blur. Accordingly, this embodiment performs a process by fixing a color plane to be referred to as a reference to the G plane The image feature calculation step S151 calculates a brightness value of the entire image as a feature of the image relating to the color blur. It is supposed that an image in which the entire image has a low brightness value is highly likely to be an image of a night view or an image taken in a dark room. It is conceivable that an image of a night view or an image taken in a dark room has an area having a high brightness value in an area having a low brightness value.

Figure 8:
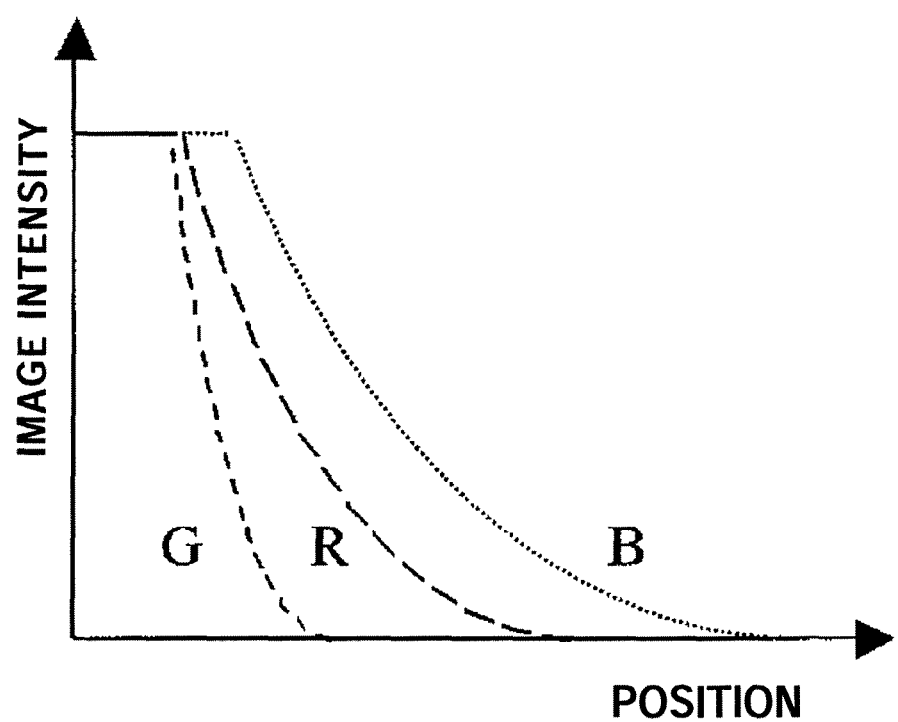
FIG. 8 is a view for explaining a color blur when a brightness difference is large.

In that case, a brightness difference increases, as shown in FIG. 8, and a color blur is highly likely to occur around the high brightness area. Since the on-focus state is set with the G wavelength, the color blurs of R and B are likely to occur. In addition, as a brightness difference increases, a color blur radius from a brightness saturation area increases. Moreover, when a part having a low brightness value is blurred with a specific color plane component, a color blur conspicuously has a high chroma.

Accordingly, a parameter indicative of the intensity used to estimate a color blur amount is made larger for a (first) image obtained from imaging of the night view or in the dark room in which the entire image has a low brightness value than a (second) image in which the entire screen has a high brightness value. This configuration can effectively reduce the color blur.

On the contrary, an image in which the entire screen has a high brightness value is supposed to be an image obtained by the outside imaging under the daylight. For this image, a color blur, if any, is less likely conspicuous because its brightness is wholly high, and an area having a large brightness difference is less likely to occur. Therefore, a color blur plane as a reduction object is set to a default color plane (for example, B plane), and an intensity parameter is set so that a color blur area can decrease and the estimated color blur intensity can be low. This configuration can estimate a small color blur amount, and avoid an excessive reduction process due to the color blur reduction process.

By calculating a brightness value of the entire image as described above, the color plane as the color blur reduction object can be selected and the spread of the color blur can be properly changed in estimating the color blur. In addition, a parameter indicative of the intensity used to estimate the color blur amount can be properly changed.

Next, the color blur reduction object plane selection step S152 determines a color blur reduction object plane or a reduction object based on the brightness value of the image obtained by the image feature calculation step S151. For example, when an input image is determined to be a night view image from a brightness value, both the R and B planes are selected as the color blur reduction object planes.

Next, the estimation parameter determination step S155 determines a parameter used for an estimation relating to the color blur, based on the brightness value as the feature of the image obtained in the image feature calculation step S151. For example, when the brightness value of the entire screen is low, a parameter is set so that a color blur area can widen and a color blur amount having a high chroma can be estimated.

One estimation method of a color blur amount executed at the color blur reducer 160 determines a color blur by a brightness slope between adjacent pixels. This method calculates a brightness slope map, estimates a color blur area using the brightness slope, and estimates a color blur amount based on the brightness slope.

For example, when $\nabla R$ is a brightness slope map to the R plane and $\nabla B$ is a brightness slope map to the B plane, $\nabla R$ and $\nabla B$ are calculated as follows:

$$\nabla R = \left(\frac{dR}{dx}, \frac{dR}{dy}\right)$$
$$\equiv \left(\frac{R(x+1, y) - R(x-1, y)}{2}, \frac{R(x, y+1) - R(x, y-1)}{2}\right)$$

$$\nabla B = \left(\frac{dB}{dx}, \frac{dB}{dy}\right)$$
$$\equiv \left(\frac{B(x+1, y) - B(x-1, y)}{2}, \frac{B(x, y+1) - B(x, y-1)}{2}\right)$$

EQUATION 1

R(x+1, y) and B(x+1, y) are values of the R and B planes for a pixel next to the target pixel at the right side.

R(x−1, y) and B(x−1, y) are values of the R and B planes for a pixel next to the target pixel at the left side.

R(x, y+1) and B(x, y+1) are values of the R and B planes for a pixel next to the target pixel at the bottom side.

R(x, y−1) and B(x, y−1) are values of the R and B planes for a pixel next to the target pixel at the top side.

A color blur area is determined based on a brightness slope value; when the brightness slope value is equal to or greater than a certain value, a color blur is determined. In that case, in addition to the brightness slopes of R and B, a brightness slope of G as a reference plane is calculated and compared to them so as to precisely identify the color blur area.

Moreover, a color blur area can be more effectively identified by changing a threshold of the brightness slope.

The estimation method of the color blur amount calculates estimated color blur amounts $E_R$ and $E_B$ by multiplying absolute values of $\nabla R$ as a brightness slope of R and $\nabla B$ as a brightness slope of B by parameters $k_R$ and $k_B$. In other words, the following equations are used to calculate the estimated color blur amounts $E_R$ and $E_B$ and the process to reduce the estimated color blur amount follows.

$$E_R = k_R |\nabla R|$$
$$E_B = k_B |\nabla B|$$

EQUATION 2

With such a color blur reduction approach, the color blur estimation parameter determination step S155 determines values of the parameters $k_R$ and $k_B$ based on the brightness value as the feature of the image. For example, when the brightness value of the entire screen is low, the values of the parameters $k_R$ and $k_B$ are determined so as to widen the color blur area and to estimate a color blur amount having a high chroma.

The image feature calculation step S151 of this embodiment calculates the brightness value of the entire image as the feature of the image, but may calculate the contrast of the entire image. An image in which the entire image has a high contrast is considered to have a large brightness difference. A color blur is likely to occur at part having a large brightness difference, a color blur area is wide, and a color blur having a high chroma is likely conspicuous. On the contrary, an image in which the entire image has a low contrast is considered to have a small brightness difference, and a color blur is less likely to occur, and less likely conspicuous even if it occurs.

Therefore, it is possible to set a large color blur estimation amount to a (first) image in which the entire image has a high contrast, and a small color blur estimation amount to a (second) image in which the entire image has a low contrast.

Second Embodiment

Figure 9:
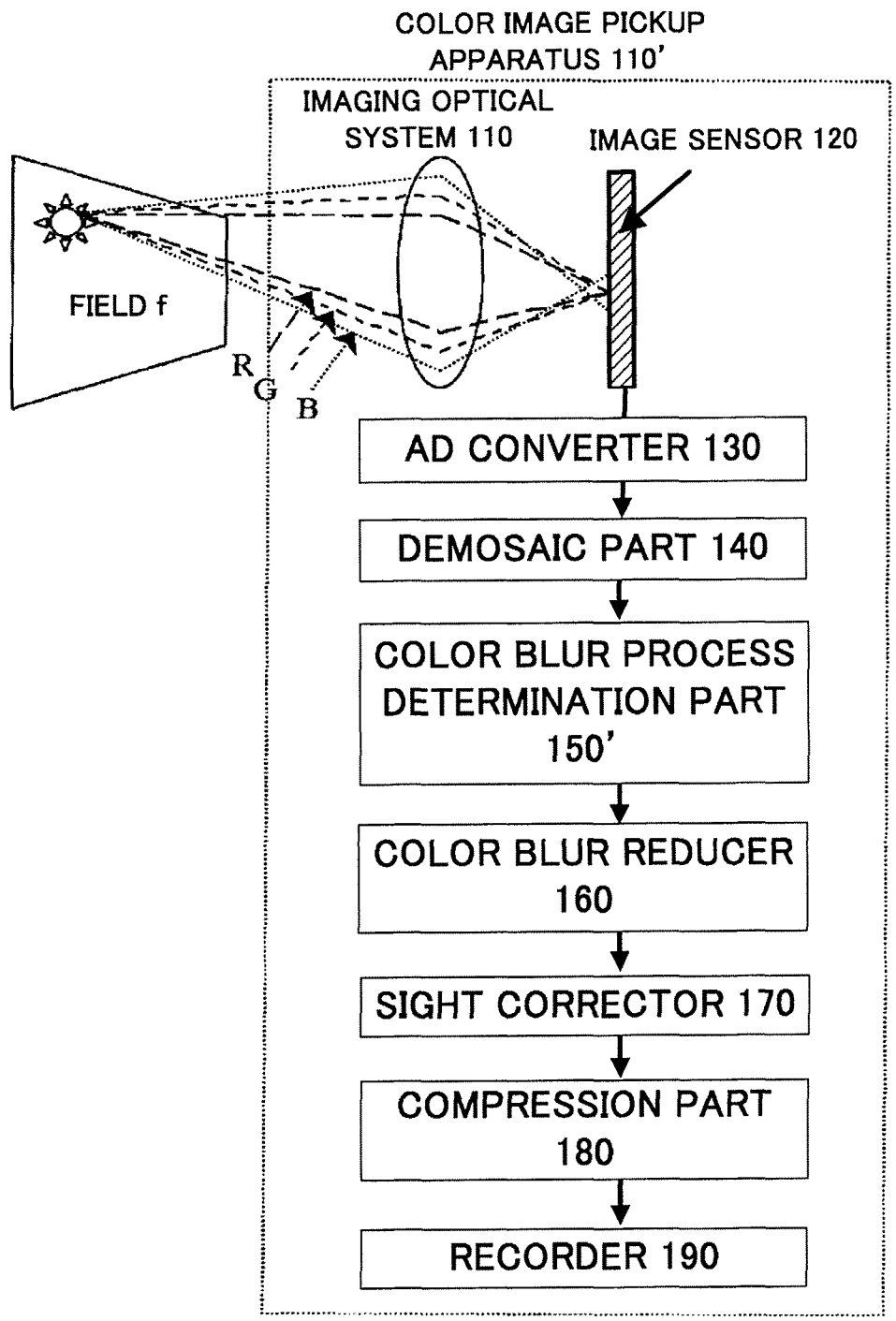
FIG. 9 is a block diagram of a structure of a color image pickup apparatus according to a second embodiment according to the present invention.

Next follows a description of a second embodiment according to the present invention. The color image pickup apparatus 100' of the second embodiment includes, as shown in FIG. 9, an imaging optical system 110, an image sensor 120, an AD converter 130, a demosaic part 140, a color blur process determination part 150', a color blur reducer 160, a sight corrector 170, a compression part 180, and a recorder 190. Those elements which are the same as corresponding elements in the first embodiment are designated by the same reference numerals. This embodiment is different from the first embodiment in a process of the color blur process determination part 150'.

Figure 10:
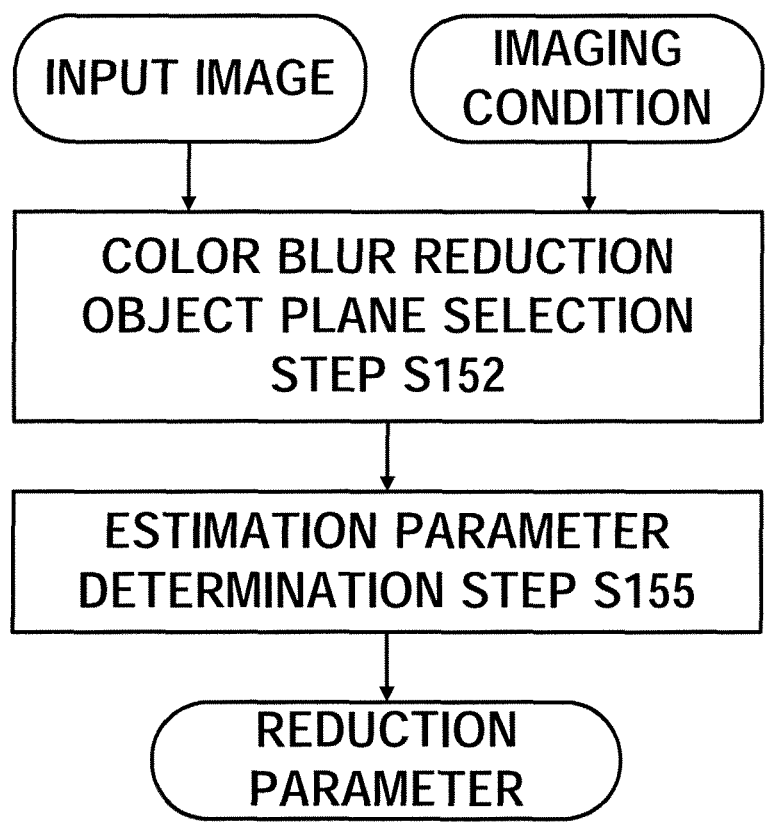
FIG. 10 is a flowchart of a structure (processing procedure) of a color blur process determination part in the image pickup apparatus according to the second embodiment.

FIG. 10 shows the color blur process determination part 150' of this embodiment. The color blur process determination part 150' has a color blur reduction object plane selection step S152, and an estimation parameter determination step S155.

An imaging condition as well as an input color image is input into the color blur process determination part 150'. The color blur reduction object plane selection step S152 determines a color blur reduction object plane according to the information of the imaging condition.

One of the imaging conditions available to a determination of a color blur reduction object plane is a setting of an imaging scene (or in other words, a setting of an imaging mode). When a photographer takes an image after intentionally setting a scene suitable for the imaging condition, an image obtained by imaging is an image in which a scene has been set. Therefore, a feature of the image can be obtained to some extent without calculating a feature (or a characteristic) of the image.

For example, when the scene setting is a night view (a night view imaging scene or a night view imaging mode), the image is supposed to be an image obtained from the night view imaging. In case of a night view image, a background is dark and a light source, such as a streetlight, is likely to cause brightness saturation and a color blur is likely to occur. Moreover, since the background is dark, a color blur having a high chroma appears in a wide range when a specific color plane component is blurred, and a color blur is likely conspicuous. In addition, the night view is in the on-focus state with the G plane, and significant amounts of the chromatic aberrations of R and B which cannot be corrected and slightly remain appear around a brightness saturation area by a high brightness light source. Therefore, color blurs of both R and B planes are likely to stand out.

With the foregoing, the color blur reduction object plane selection step S152 determines that it is desirable to set a color plane of the reduction object to both the R plane and the B plane for the scene setting of the night view.

The estimation parameter determination step S155 changes a setting of a parameter that designates the spread of a color blur for a night view imaging scene image (first image) so as to determine more part as a color blur area than that for an imaging scene image (second image) other than the night view imaging scene. In addition, the estimation parameter determination step S155 sets a parameter used to estimate a color blur amount so that a larger color blur amount can be estimated.

One estimation method of the color blur amount performed by the color blur reducer 160 is to calculate a brightness saturation area and other areas in an image, to perform a convolution process, and to determine a color blur area and a color blur amount. An initial area division divides a reference color plane into a saturation area and an unsaturation area by utilizing a certain threshold, and calculates a saturation degree S in which each area is expressed by a binary value. Subsequently, a convolution process is performed for this saturation degree S so as to determine a color blur area and a color blur amount. When the color blur reduction object plane selection step S152 selects the R and B planes as the color blur reduction object plane, a color blur amount of each plane is calculated through the following convolution processes, where $S_R$ and $S_B$ are color blurs of these planes:

$$S_R = k_R \otimes S$$

$$S_B = k_B \otimes S \qquad \text{EQUATION 3}$$

$k_R$ and $k_B$ are convolution Kernals; as the Kernal sizes of $k_R$ and $k_B$ increase, a color blur area widens and a color blur intensity etc. can be set by a value of the Kernal.

Hence, when the color blur reducer 160 uses such a color blur reduction approach, the color blur estimation parameter determination step S155 determines a size and value of the convolution Kernal as a parameter that designates a color blur area and a color blur intensity in accordance with the scene setting.

Figure 11:
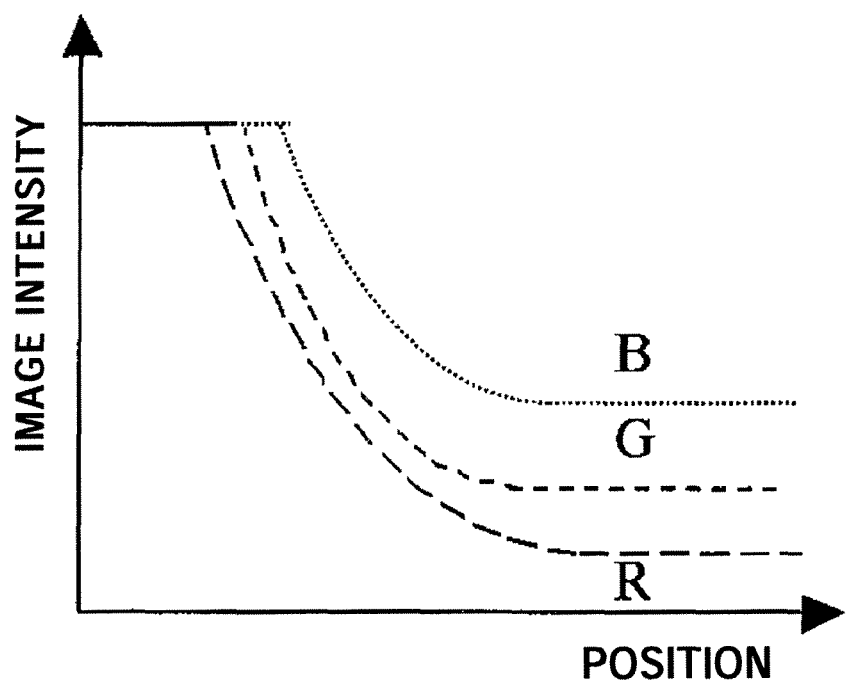
FIG. 11 is a view for explaining values of RGB planes when a bluish image has a blue blur in an area having a large brightness difference.
Figure 12:
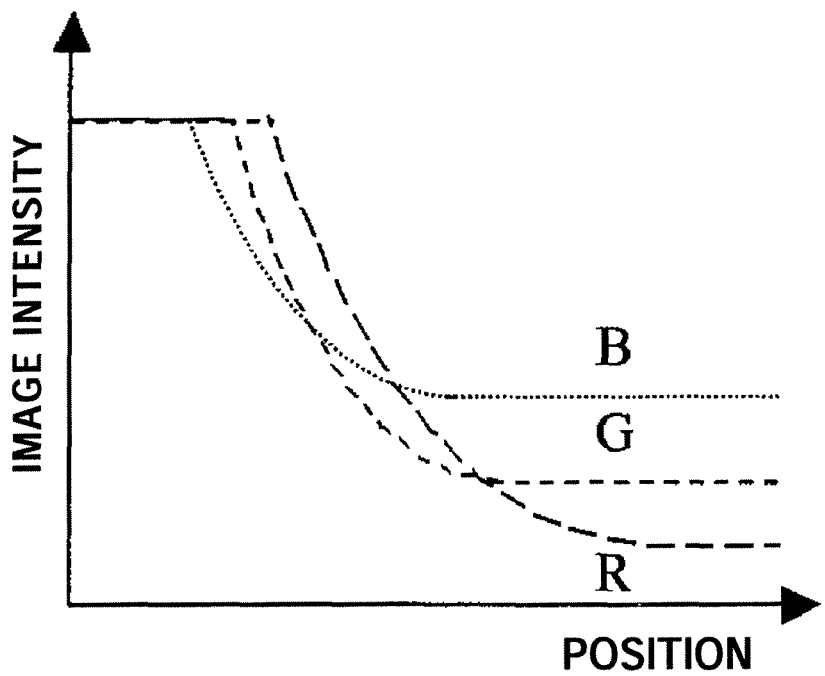
FIG. 12 is a view for explaining values of the RGB planes when a bluish image has a red blur in an area having a large brightness difference.

Although the night view is used as a scene setting example, another scene setting (or another imaging mode) may be used to determine a color blur. For example, when the scene setting is underwater, an image obtained by imaging is estimated to be a bluish image. In case of a bluish image, the entire image is bluish, as shown in FIG. 11, and there are no sudden color changes and a few blue blurs are less likely conspicuous. The problem arises when there is a reddish and high brightness area in a bluish image. When there is a reddish and high brightness area, a red blur is likely to occur around the reddish and high brightness area, as shown in FIG. 12. When FIGS. 11 and 12 are compared with each other, a color different from the hue of the entire image occurs and is likely conspicuous around the reddish and high brightness area because the red is blurred in FIG. 12. Therefore, the color blur reduction object plane selection step S152 sets the color blur reduction object plane to the R plane.

It is rare in the underwater imaging, even when there is a reddish and high brightness area, that an area that causes the brightness saturation exists. Since the color blur area is narrow and the color blur intensity is small, the estimation parameter determination step S155 sets a parameter that narrows a color blur area and reduces the color blur intensity, and reducing a color blur estimation amount.

In a variety of scene settings, a proper color blur reduction object plane and a parameter that is used to estimate a color blur area and the color blur intensity is set.

Third Embodiment

Figure 13:
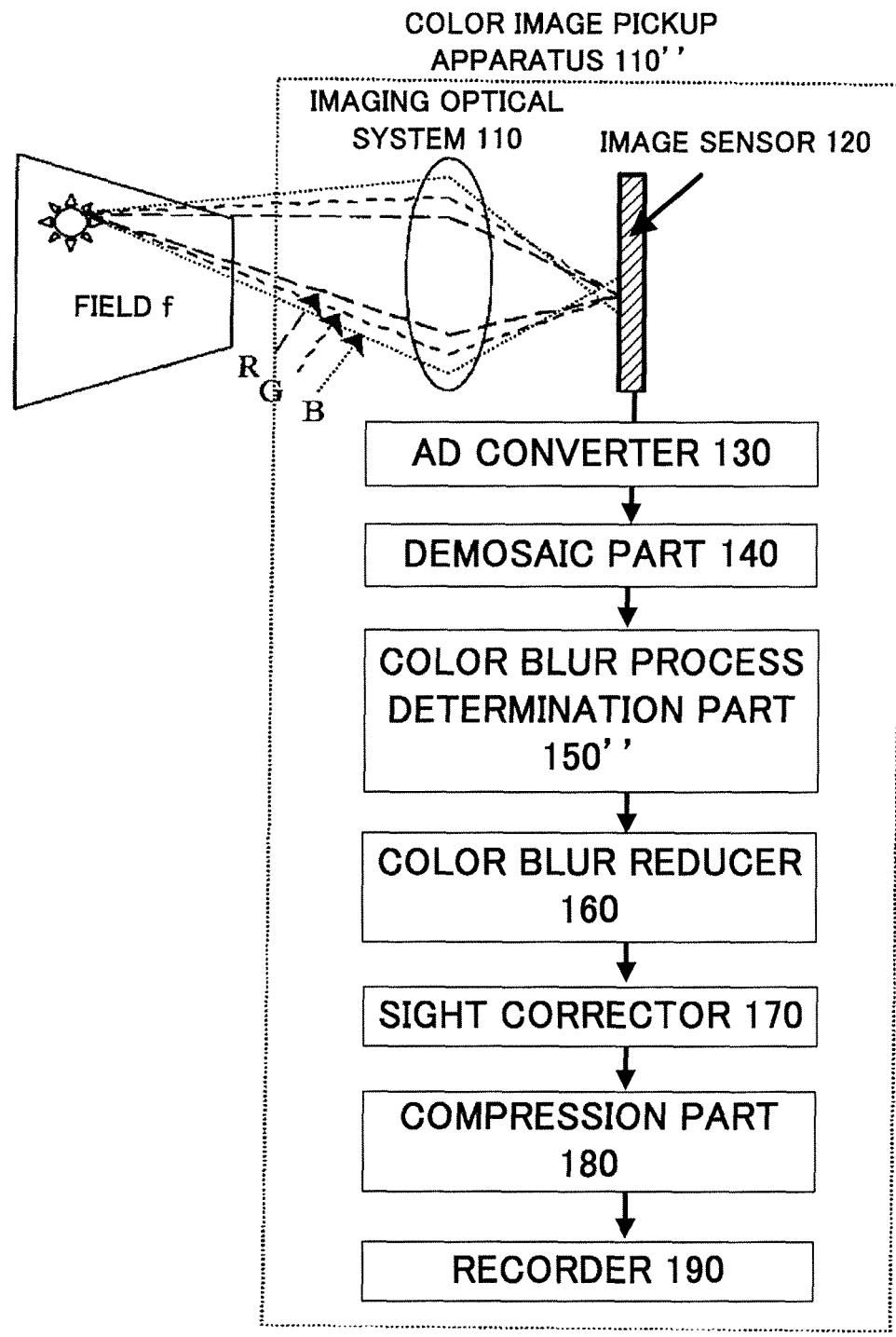
FIG. 13 is a block diagram of a structure of a color image pickup apparatus according to a third embodiment of the present invention.

Next follows a description of a third embodiment of the present invention. The color image pickup apparatus 100" of this embodiment includes, as shown in FIG. 13, an imaging optical system 110, an image sensor 120, an AD converter 130, a demosaic part 140, a color blur process determination part 150", a color blur reducer 160, a sight corrector 170, a compression part 180, and a recorder 190. Those elements which are the same as corresponding elements in the first embodiment are designated by the same reference numerals. This embodiment is different from the first embodiment in a process of the color blur process determination part 150".

Figure 14:
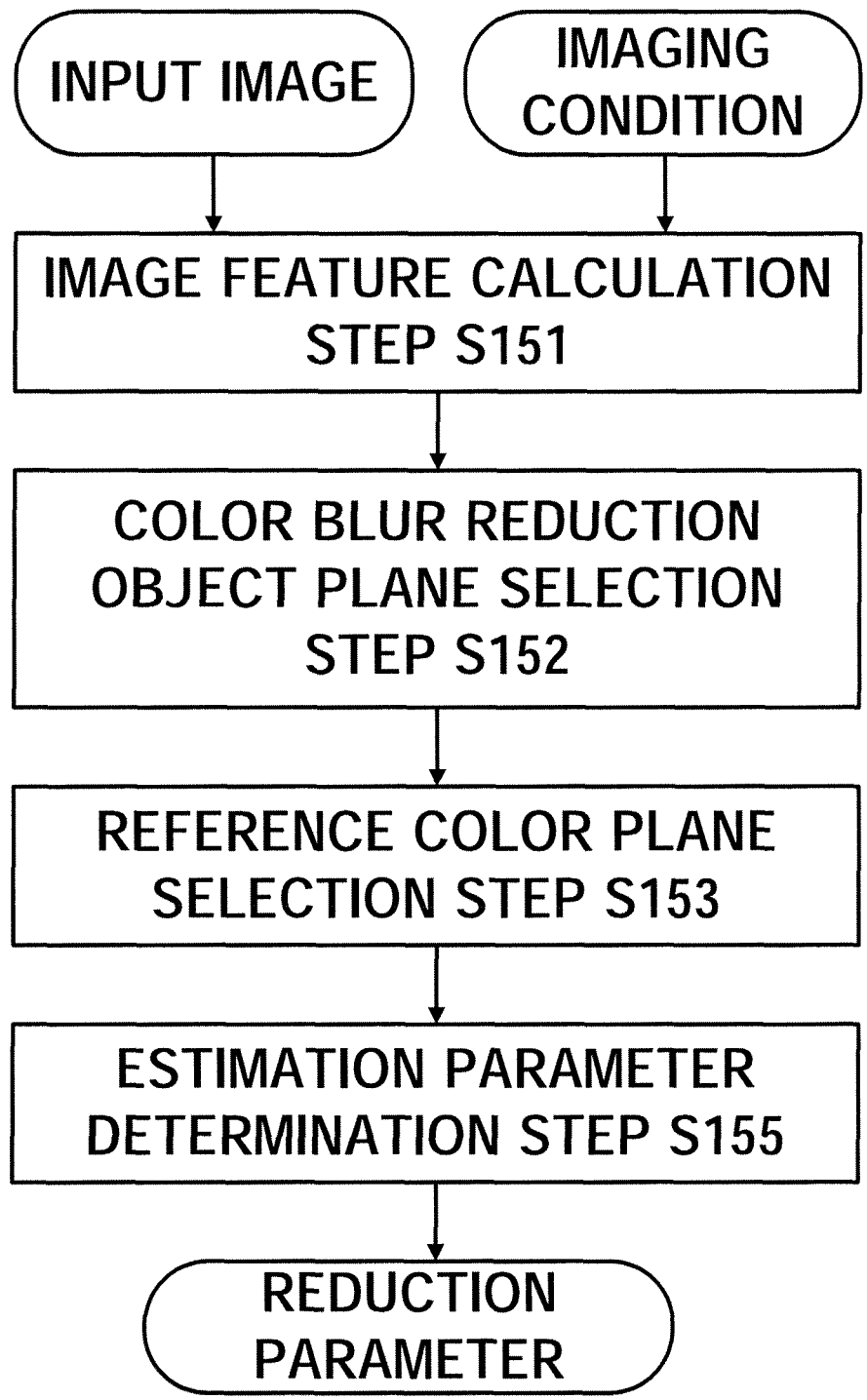
FIG. 14 a flowchart of a structure (processing procedure) of a color blur process determination part in the image pickup apparatus according to the third embodiment.

FIG. 14 shows the color blur process determination part 150" of this embodiment. The color blur process determination part 150" includes an image feature calculation step S151, a color blur reduction object plane selection step S152, a reference color plane selection step S153, an estimation method selection step S154, and an estimation parameter determinations step S155.

The image feature calculation step S151 uses a hue or a white balance ("WB") of the entire image as a feature (or a characteristic) of the image relating to the color blur. The hue may be said to be "a color temperature" in different words, and the color temperature may be used as the feature of the image.

The hue of the entire screen is greatly affected by the environmental light, and the color blur is affected by a spectroscopic distribution of the light source. Therefore, due to the spectroscopic distribution of the environmental light, a color of a blur that is likely to occur in an area having a large brightness difference can be estimated.

However, a color that blurs and is similar to the environmental light is less likely conspicuous and unlikely to be recognized as a clear color blur; it is less necessity to consider the color blur as a color blur reduction object.

An image having a certain tint is unlikely to include only the same color as the hue of the entire image and, for example, a high brightness light source which has a color different from the hue of the entire image is likely to exist in the image. In this case, it is conceivable that a blur of a color different from the hue of the entire image occurs around the high brightness light source. The blur of the color different from the tint of the entire image is likely to be perceived as a color blur that causes a sense of discomfort. Therefore, it is reasonable that a color different from the hue of the entire image is set to a blur reduction object. A color plane that serves as a color blur reduction object can be properly selected by calculating the hue of the entire image.

In addition, depending upon the degree of the hue of the entire image, the color plane to be referred to as a reference needs to be changed. A normal imaging optical system is designed with the G wavelength region as a reference, and the chromatic aberrations from the R wavelength to the B wavelength appears as a color blur although the chromatic aberrations differ according to the imaging optical systems. Since this color blur occurs as a result of that the G wavelength is used for focusing, the color plane to be referred to as a reference may usually be set to the G plane.

However, this is not the case where a wavelength other than the G wavelength is in the on-focus state. In other words, when the entire image has a few G wavelengths and another wavelength is in the on-focus state, a blurred color is not the R or B plane, and a color blur cannot be effectively reduced when the color plane to be referred to as a reference remained to the G plane. Therefore, the color plane to be referred to as a reference needs variable.

One image that has a few G wavelengths and can be focused with another wavelength is an image in which the hue of the entire image extremely is biased to R and B. Therefore, a color plane to be referred to as a reference can be properly selected by calculating the hue of the entire image.

Figure 15:
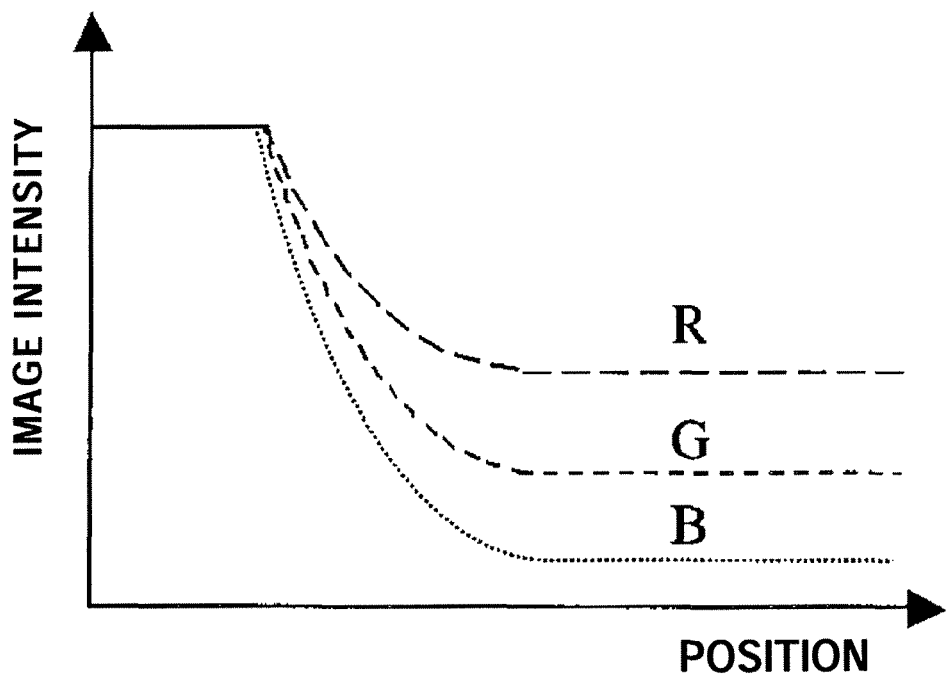
FIG. 15 is a view for explaining values of the RGB planes when a reddish image has no color blur in an area having a large brightness difference.

For example, assume imaging under the reddish environmental light, such as in the evening or under the photoflood. When no color blur occurs in an area having a large brightness difference, the RGB planes are as shown in FIG. 15. However, imaging under the reddish environmental light is likely to cause a red blur in an area having a large brightness difference as shown in FIG. 16, because the area has a large light quantity of a long wavelength (R component) and a small light quantity of a short wavelength (B component).

Figure 16:
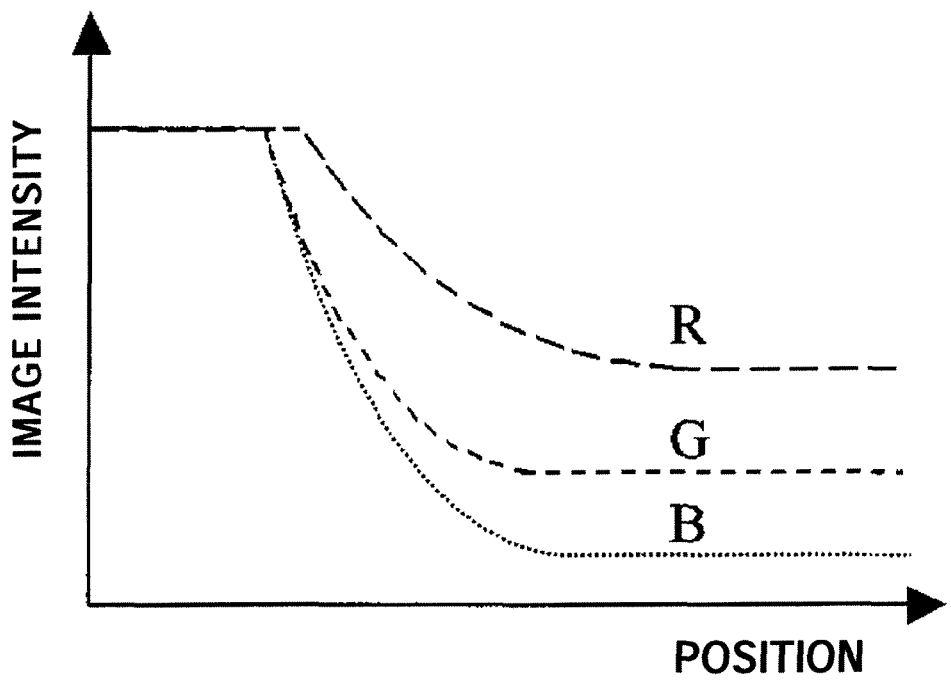
FIG. 16 is a view for explaining values of the RGB planes when a reddish image has a red blur in an area having a large brightness difference.
Figure 17:
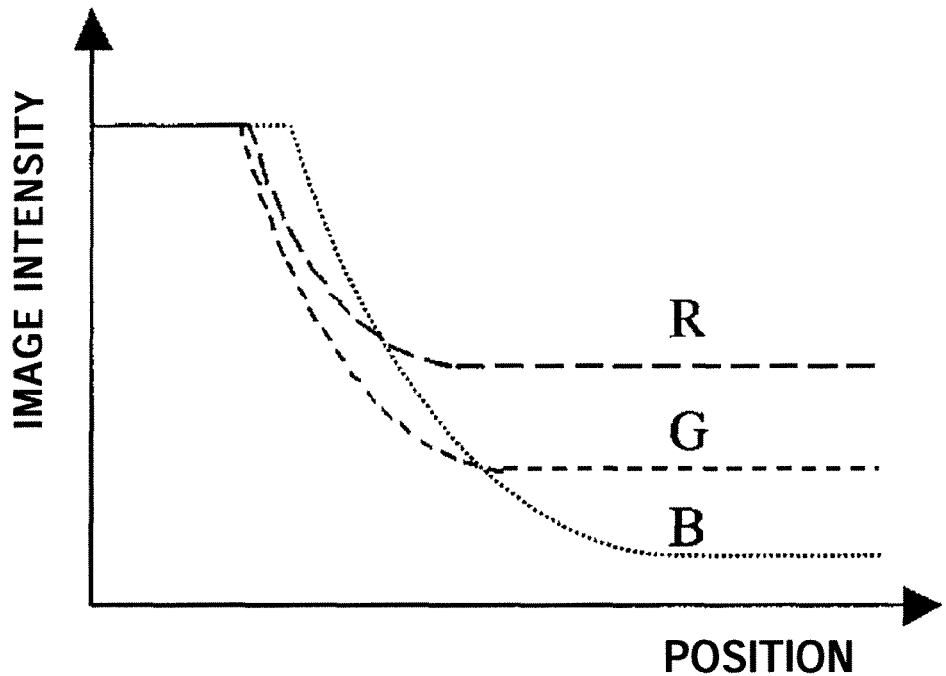
FIG. 17 is a view for explaining values of the RGB planes when a reddish image has a blue blur in an area having a large brightness difference.

However, as understood from FIGS. 15 and 16, the entire screen is reddish, no sudden color changes occur, and a slight red blur is less likely to stand out. The problem arises when there is a high brightness light source having a large light quantity amount of the short wavelength (B component) in the reddish image. When the high brightness light source is saturated and imaged, as shown in FIG. 17, a blue blur is likely to occur around the brightness saturation area. When FIGS. 16 and 17 are compared with each other, the blue is blurred and a color different from the hue of the entire image occurs around the brightness saturation area, and is likely conspicuous. In addition, when the entire image is reddish due to the influence of the environmental light, it is blended with a blue blur and becomes a conspicuous purple blur.

Thus, a conspicuous color blur can be identified by calculating the hue of the entire image. The image feature calculation step S151 calculates the hue of the entire image.

The color blur reduction object plane selection step S152 selects the color blur reduction object plane based on the hue calculated by the image feature calculation step S151.

For a (first) image in which the entire image is reddish, the B plane is set to the plane as the color blur reduction object.

Figure 18:
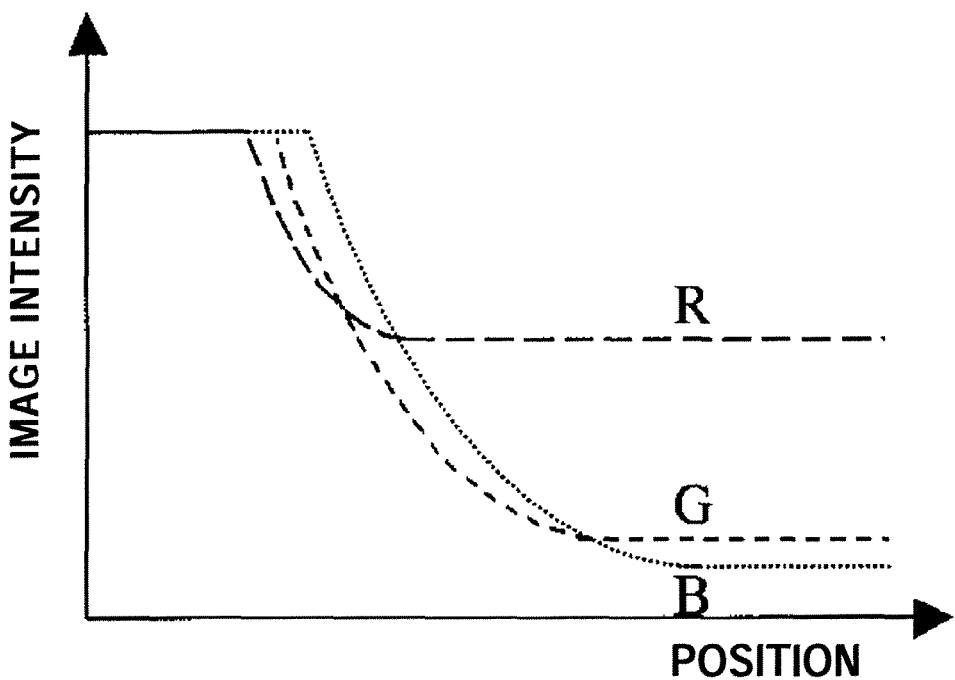
FIG. 18 is a view for explaining values of the RGB planes when the R plane is in the on-focus state in an area having a large brightness difference of a reddish image.

When the entire image is strongly reddish and the R wavelength is in the on-focus state, the G plane and the B plane blur as shown in FIG. 18, and a purple blur close to cyan is conspicuous. In that case, the reference color plane selection step S153 sets the color plane to be referred to as a reference to the R plane. The color blur reduction object plane selection step S152 sets the B plane and the G plane to the color blur reduction object plane.

Conversely, in a (second) image in which the entire screen is bluish, a blue blur is less likely conspicuous but a red blur turns into a purple blur after blended with the hue of the entire image and then stands out. In that case, a proper plane setting is performed as in the above example: For example, the color blur reduction object plane is set to the R plane, and the color plane to be referred to as a reference is set to the B plane.

The estimation parameter determination step S155 determines a parameter that is used to estimate a color blur area and a parameter that determines the color blur intensity, according to the feature of the image and the imaging condition obtained by the image feature calculation step S151.

A stop value (an aperture value) is one that influences the color blur in the imaging condition. As the stop is opened, a depth of field ("DOF") becomes small, an image blurs as a distance from a focus position increases, and thus the color blur spread is likely to increase. On the other hand, as the stop is closed, a DOF becomes large, a blur amount becomes small, and the color blur spread is likely to reduce. Therefore, a parameter that is used to estimate the color blur area can be set according to the stop value at the imaging time.

A result of the color blur process determination part 150 is input to the color blur reducer 160, which performs a proper color blur reduction process for each image based on the result.

Figure 19:
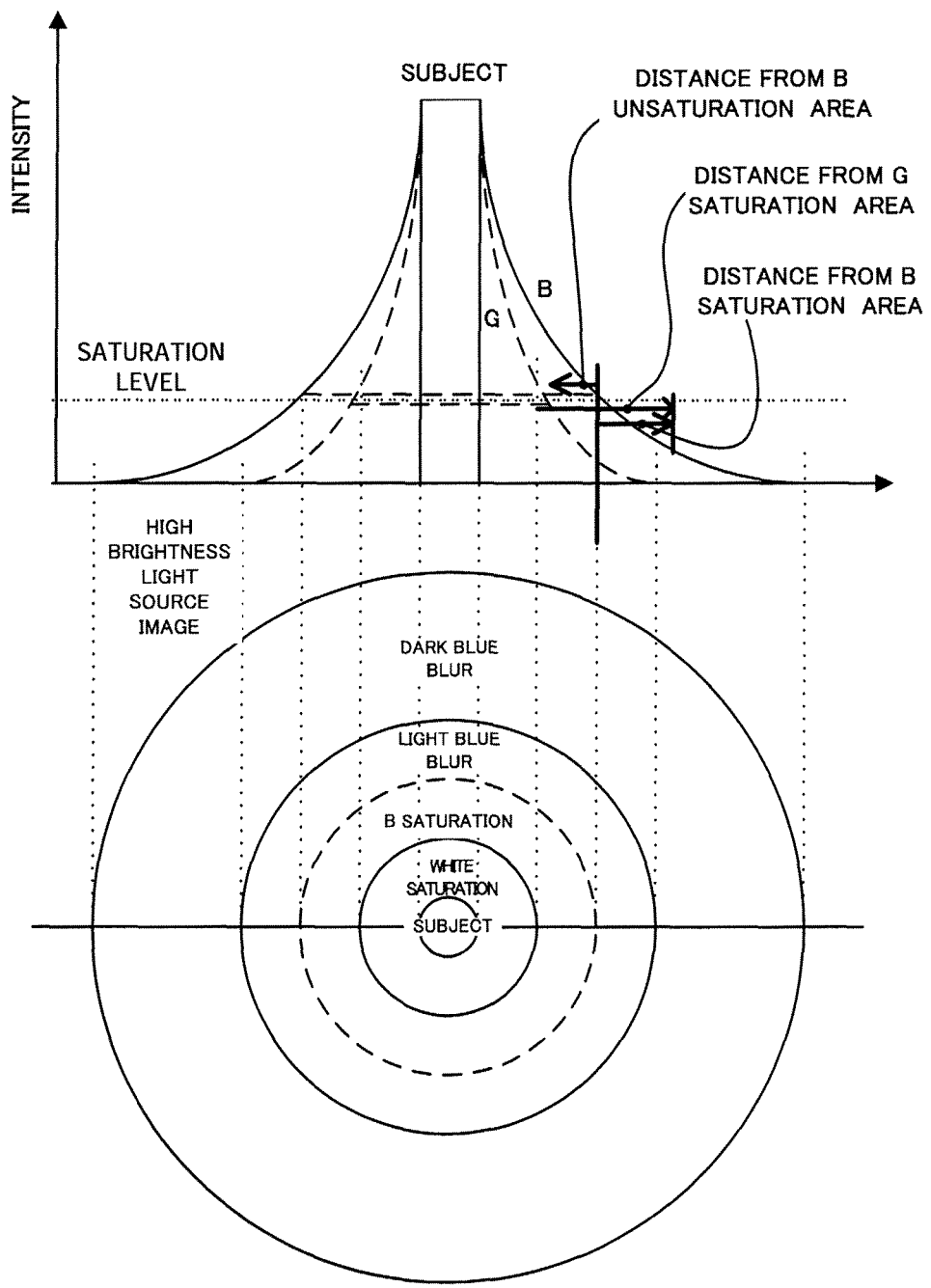
FIG. 19 is a view for explaining a distance from a brightness saturation area and a distance from a brightness unsaturation area.

One estimation method of the color blur amount performed by the color blur reducer 160 detects a brightness saturation area on the premise that a color blur occurs around the brightness saturation area, and determines a color blur amount according to a distance from the brightness saturation area. This estimation method calculates a distance from the brightness saturation area shown in FIG. 19 and a distance from the brightness unsaturation area in a plane to be referred to as a reference and a color blur reduction object plane. This method then calculates a saturation radius from these calculated distances, estimates the light source intensity, and produces and estimates a function model that damps according to a distance from the brightness saturation area.

In this case, a color blur is modeled by using a base value, a damping parameter, a parameter indicative of the spread of a color blur, and the like. Once a model matching the color blur is produced, the color blur can be effectively reduced but a shift of the model causes an insufficient reduction of a color blur or an unnatural color. Therefore, a parameter can be changed for each image, and a color blur amount is properly estimated.

When this estimation method is used, the estimation parameter determined by the estimation parameter determination step S155 becomes a base value, a damping parameter, and a parameter indicative of the color blur spread.

Fourth Embodiment

Figure 20:
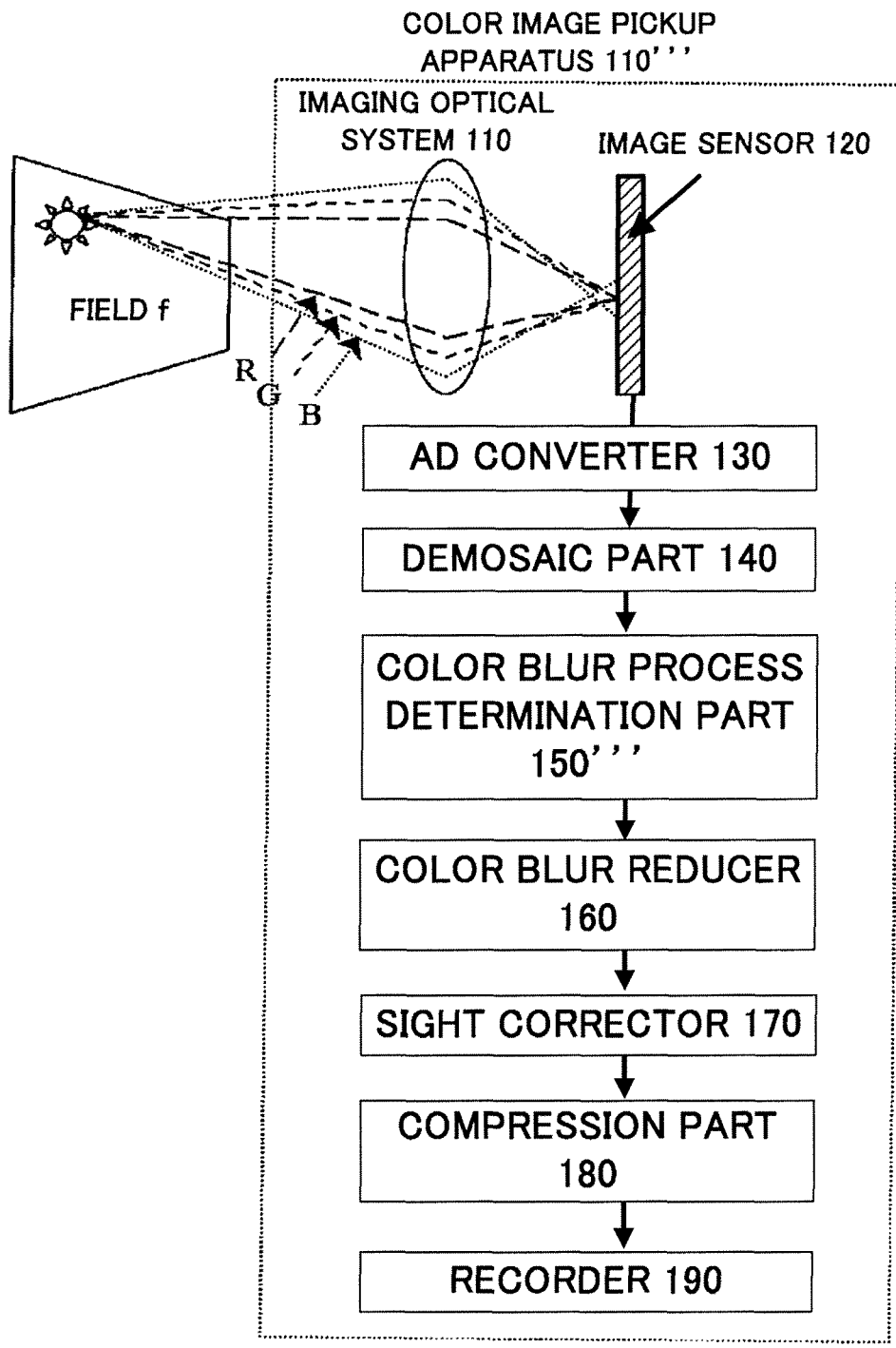
FIG. 20 is a block diagram of a structure of a color image pickup apparatus according to a fourth embodiment of the present invention.

Next follows a description of a fourth embodiment. A color image pickup apparatus 100''' of this embodiment includes, as shown in FIG. 20, an imaging optical system 110, an image sensor 120, an AD converter 130, a demosaic part 140, a color blur process determination part 150''', a color blur reducer 160, a sight corrector 170, a compression part 180, and a recorder 190. Those elements which are the same as corresponding elements in the first embodiment are designated by the same reference numerals. This embodiment is different from the first embodiment in a process of the color blur process determination part 150'''.

Figure 21:
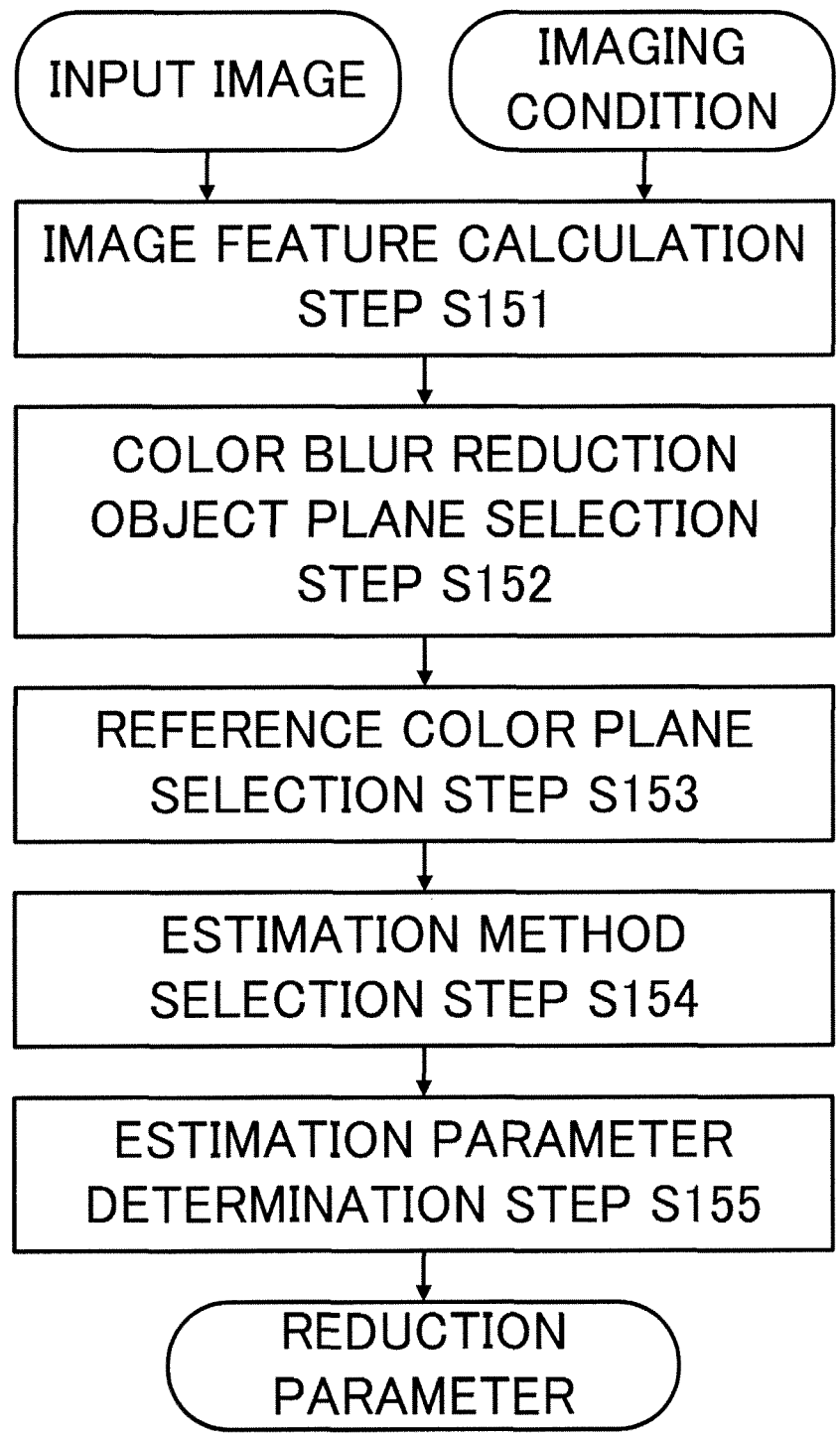
FIG. 21 a flowchart of a structure (processing procedure) of a color blur process determination part in the image pickup apparatus according to the fourth embodiment.

FIG. 21 shows the color blur process determination part 150'''. The color blur process determination part 150''' includes an image feature calculation step S151, a color blur reduction object plane selection step S152, a reference color plane selection step S153, an estimation method selection step S154, and an estimation parameter determination step S155.

The image feature calculation step S151 calculates, as a feature (or a characteristic) of an image, a brightness value of each color plane around a brightness saturation area in the image. When a color plane around the brightness saturation area has a higher brightness value than that of the G plane that is generally serves as a reference color plane, the color of the color plane is estimated to blur. The color blur reduction object plane selection step S152 selects the color plane as a reduction object based on this result.

Since it is conceivable that a blurred color is different for each brightness saturation area in the image, a color plane that serves as a color blur reduction object may be differently set for each area in the image.

The reference color plane selection step S153 sets another plane having a small brightness saturation area to a reference color plane based on the result from the image feature calculation step S151 when the brightness saturation area of the other color plane is smaller than the brightness saturation area of the G plane around the brightness saturation area in the image. A phenomenon in which the brightness saturation area of a color plane other than the G plane is small is likely to occur when a wavelength other than the G wavelength is in the on-focus state. In addition, this phenomenon depends upon the spectroscopic distribution of the object in the brightness saturation area in the image etc.

The estimation method selection step S154 selects an estimation method of a color blur area and a color blur amount based on the brightness value calculated by the image feature calculation step S151. This is because the estimation method includes a method of providing a color blur reduction process only when there is a brightness saturation area of a certain threshold or greater in the image, and a method of providing a color blur reduction process even when there is no brightness saturation area in the image.

For example, a method of using a distance from the brightness saturation area shown by the color blur reducer 160 of the third embodiment, and a method of using a convolution process shown by the color reducer of the second embodiment are approaches of setting a color blur around the brightness saturation area to a reduction object.

On the other hand, a method of using a brightness slope as in the color blur reducer 160 of the first embodiment identifies a color blur by the brightness slope, and sets to the reduction object a color blur that occurs in an area other than the brightness saturation area. In the setting, when an image has a brightness saturation area of a certain threshold or greater, an approach, such as a method of using a distance from the brightness saturation area and a method of using a convolution process, is selected, and when there is no image that has a brightness saturation area of a certain threshold or greater, an approach, such as a method of using a brightness slope, is selected.

Alternatively, the estimation method selection step S154 may select whether a color blur reduction process is to be performed. For example, a switching action is provided such that the color blur reduction process can follow when an input image is determined to be a night view image in which a color blur stands out, based on the imaging condition and the feature (or a characteristic) of the image obtained by the image feature calculation step S151, and no color blur reduction process can be performed otherwise.

The estimation parameter determination step S155 determines a parameter that is used for the estimation method selected by the estimation method selection step S154, by using the imaging condition and the result of the image feature calculation step S151.

Fifth Embodiment

Next follows a description of the fifth embodiment of the present invention. The color image pickup apparatus 100 of this embodiment is the same as the color image pickup apparatus 100 shown in FIG. 3 (or of the first embodiment). In this embodiment, the color blur process determination part 150 and the color blur reducer 160 provide the same processes of the color blur process determination part 150 (or 150', 150'' or 150''') and the color blur reducer 160 in the first to fourth embodiments.

This embodiment utilizes a type of an employed lens for an imaging condition for the color blur reduction object plane selection step S152 and the estimation parameter determination step S155 in the color blur process determination part 150 (see FIGS. 7, 10, 14 and 21) to determine a parameter. The chromatic aberration that causes a color blur differs according to a type of a lens, a chromatic aberration amount is known in the design stage, and a color in which each type of lens is likely to blur and a color amount can be estimated. Therefore, this embodiment uses for the imaging condition a type of a lens employed for the imaging, and determines a color in which the lens is likely to blur and a blur amount, in that lens.

For example, in using a lens that has no chromatic aberration between the R and G wavelengths and is likely to generate a blue blur due to the remaining chromatic aberration of the B wavelength, the color blur reduction object plane selection step S152 sets the B plane to the reduction object plane. In addition, the reference color plane selection step S153 in the process shown in FIGS. 14 and 21 sets the G plane to a color plane to be referred to as a reference.

The estimation parameter determination step S155 sets a parameter of the color blur estimation intensity based on the remaining chromatic aberration amount.

Since the chromatic aberration that causes a color blur differs according to a zoom state, a zoom state may be used as the imaging condition. Characteristics of a color of which the blur is likely to occur at the wide angle side and a color of which the blur is likely to occur at the telescopic side are previously known; a parameter that is used to estimate a color of a reduction object and a blur amount of the color can be set according to a type of a lens used for imaging and a zoom state of the lens to be used.

For example, assume use of a lens that is likely to generate, due to a remaining chromatic aberration of the design, a blue blur as a distance is close to the wide angle side, a red blur as a distance is close to the telescopic side, and a few color blur in the intermediate zoom region. The color blur reduction object plane selection step S152 sets the R plane to the reduction object plane for an image obtained by imaging at the telescopic side, and sets the B plane to the reduction object plane for an image obtained by imaging at the wide angle side. In using such a lens, the reference color plane selection step S153 can set the G plane to a plane to be referred to as a reference.

The estimation parameter determination step S155 sets a parameter of the color blur estimation intensity based on the remaining chromatic aberration amount. In the above example with the lens to be used, a parameter is set such that the color blur area can spread in the image obtained by imaging and the color blur intensity can increase as a distance approaches to the wide angle side and the telescopic side.

Since the chromatic aberration that causes a color blur differs according to an object distance used for focusing, the imaging condition may use an object distance (a distance from a lens to an object to be focused). The intensity of a color blur differs between a focusing state onto a close object and a focusing state onto a distant object.

For example, assume use of a lens having a large color blur amount when the lens focuses onto a close object, a small color blur amount when the lens focuses onto a distant object. In that case, the estimation parameter determination step S155 sets a parameter that increases the color blur estimation intensity when the object distance is small, and reduces the color blur estimation intensity when the object distance is large.

The color blur reduction method (image processing method) explained in the above first to fifth embodiments may be used separately or in combination. In other words, the color blur process determination part may change at least one of a color blur that serves as a reduction object and an estimation method of an amount of the color blur according to at least one of a feature (or a characteristic) of an image and an imaging condition. In other words, at least one of a color plane having the color blur that serves as the reduction object, a parameter used to estimate a color blur area, a parameter that is used to estimate the color blur intensity, a color plane to be referred to as a reference in the color blur reduction process and a color blur estimation method may be changed.

In addition, the above first to fifth embodiments discuss the color image pickup apparatus that includes all components from the imaging optical system 110 to the recorder 190. However, as an apparatus separate from the color image pickup apparatus, an image processing apparatus (such as a personal computer) having at least the color blur process determination part 150 (or 150', 150'', or 150''') and the color blur reducer 160 may be formed. In this case, a color image taken by the color image pickup apparatus and stored in a recording medium, such as a semiconductor memory and a magnetic/optical disc, may be input into the image processing apparatus. In addition, the color image pickup apparatus and the image processing apparatus may be connected to each other via a cable, a radio LAN, etc. so as to send an image from the color image pickup apparatus to the image processing apparatus.

As described above, each embodiment can properly provide a color blur reduction process to images having various color blurs, effectively reduce the color blur of each image, and obtain a natural image without a sense of discomfort.

In addition, this color blur reduction process can mitigate a limitation of a longitudinal chromatic aberration of the imaging optical system in the image pickup apparatus, improve another aberrational correction, and reduce a size of the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298532, filed on Nov. 16, 2007, which is hereby incorporated by reference herein in its entirety.

What is claimed is:

1. An image processing apparatus configured to perform a process to reduce a color blur in a color image, said image processing apparatus comprising a color blur process determination part configured to change at least one of a color blur that serves as a reduction object and an estimation method of an amount of the color blur according to at least one of a characteristic of an image and an imaging condition, wherein the color blur process determination part changes at least one of a color plane of the color blur as the reduction object, a parameter that is used to estimate an area of the color blur, a parameter that is used to estimate an intensity of the color blur, a color plane that is referred to as a reference in the reduction process of the color blur, and an estimation method of the color blur, according to at least one of the characteristic of the image and the imaging condition.

2. An image processing apparatus according to claim 1, wherein the characteristic of the image includes at least one of a brightness of an entire image, a contrast of the entire image, a hue of the entire image, and a hue around a brightness saturation area in the image.

3. An image processing apparatus according to claim 2, wherein the color blur process determination part sets, when a brightness of an entire image of a first image is lower than that of an entire image of a second image, the color blur amount to be estimated to the first image greater than that to the second image.

4. An image processing apparatus according to claim 2, wherein the color blur process determination part sets, when a contrast of an entire image of a first image is lower than that of an entire image of a second image, the color blur amount to be estimated to a first image greater than that to a second image.

5. An image processing apparatus according to claim 2, wherein the color blur process determination part sets to a blue plane a color plane having the color blur that serves as the reduction object when the image is reddish as a whole, and the color blur process determination part sets to a red plane a color plane having the color blur that serves as the reduction object when the image is bluish as a whole.

6. An image processing apparatus according to claim 1, wherein the imaging condition includes at least one of an imaging scene, a type of a lens used for imaging, a zoom state of the lens, a stop value of the lens, and an object distance from the lens.

7. An image processing apparatus according to claim 6, wherein the color process determination part sets, when a first image is an image of a night view imaging scene and a second image is an image of an imaging scene other than the night view imaging scene, a color blur amount to be estimated to the first image greater than that to the second image.

8. An image processing method configured to perform a process to reduce a color blur in a color image, said image processing method comprising a color blur process determination step of changing at least one of a color blur that serves as a reduction object and an estimation method of an amount of the color blur according to at least one of a characteristic of an image and an imaging condition,
wherein, in the color blur process determination step, at least one of a color plane of the color blur as the reduction object, a parameter that is used to estimate an area of the color blur, a parameter that is used to estimate an intensity of the color blur, a color plane that is referred to as a reference in the reduction process of the color blur, and an estimation method of the color blur is changed according to at least one of the characteristic of the image and the imaging condition.

9. An image pickup apparatus comprising:
an image pickup element configured to pick up a color image; and
an image processing apparatus configured to perform a process to reduce a color blur in the color image, said image pickup apparatus comprising a color blur process determination part configured to change at least one of a color blur that serves as a reduction object and an estimation method of an amount of the color blur according to at least one of a characteristic of an image and an imaging condition,
wherein the color blur process determination part changes at least one of a color plane of the color blur as the reduction object, a parameter that is used to estimate an area of the color blur, a parameter that is used to estimate an intensity of the color blur, a color plane that is referred to as a reference in the reduction process of the color blur, and an estimation method of the color blur, according to at least one of the characteristic of the image and the imaging condition.

10. An image processing apparatus configured to perform a process to reduce a color blur in a color image, said image processing apparatus comprising a color blur process determination part configured to change at least one of a color blur that serves as a reduction object and an estimation method of an amount of the color blur according to at least one of a characteristic of an image and an imaging condition,
wherein the characteristic of the image includes at least one of a brightness of an entire image, a contrast of the entire image, a hue of the entire image, and a hue around a brightness saturation area in the image.

11. An image processing apparatus according to claim 10, wherein the color blur process determination part sets, when a brightness of an entire image of a first image is lower than that of an entire image of a second image, the color blur amount to be estimated to the first image greater than that to the second image.

12. An image processing apparatus according to claim 10, wherein the color blur process determination part sets, when a contrast of an entire image of a first image is lower than that of an entire image of a second image, the color blur amount to be estimated to a first image greater than that to a second image.

13. An image processing apparatus according to claim 10, wherein the color blur process determination part sets to a blue plane a color plane having the color blur that serves as the reduction object when the image is reddish as a whole, and the color blur process determination part sets to a red plane a color plane having the color blur that serves as the reduction object when the image is bluish as a whole.

14. An image processing apparatus according to claim 10, wherein the imaging condition includes at least one of an imaging scene, a type of a lens used for imaging, a zoom state of the lens, a stop value of the lens, and an object distance from the lens.

15. An image processing apparatus according to claim 14, wherein the color process determination part sets, when a first image is an image of a night view imaging scene and a second image is an image of an imaging scene other than the night view imaging scene, a color blur amount to be estimated to the first image greater than that to the second image.

16. An image processing method configured to perform a process to reduce a color blur in a color image, said image processing method comprising a color blur process determination step of changing at least one of a color blur that serves as a reduction object and an estimation method of an amount of the color blur according to at least one of a characteristic of an image and an imaging condition,
wherein the characteristic of the image includes at least one of a brightness of an entire image, a contrast of the entire image, a hue of the entire image, and a hue around a brightness saturation area in the image.

17. An image pickup apparatus comprising:
an image pickup element configured to pick up a color image; and
an image processing apparatus configured to perform a process to reduce a color blur in the color image, said image processing apparatus comprising a color blur process determination part configured to change at least one of a color blur that serves as a reduction object and an estimation method of an amount of the color blur according to at least one of a characteristic of an image and an imaging condition,
wherein the characteristic of the image includes at least one of a brightness of an entire image, a contrast of the entire image, a hue of the entire image, and a hue around a brightness saturation area in the image.

* * * * *